United States Patent [19]

Graves et al.

[11] Patent Number: 4,756,412
[45] Date of Patent: Jul. 12, 1988

[54] FISHING TACKLE BOX

[76] Inventors: Don Graves, 14 Swan Pond Rd., Harriman, Tenn. 37748; Don Ballew, 1835 Atlantic Ave., Apt. 704, Cocoa Beach, Fla. 32931

[21] Appl. No.: 135,313

[22] Filed: Dec. 21, 1987

[51] Int. Cl.$^4$ .................... A01K 97/06; B65D 85/00
[52] U.S. Cl. .................... 206/315.11; 43/54.1; 43/57.1; 206/372; 211/70; 312/135
[58] Field of Search .................. D3/38; 43/54.1, 57.1; 206/315.1, 315.11, 349, 372, 373; 211/70; 312/135

[56] References Cited

U.S. PATENT DOCUMENTS

| | | | |
|---|---|---|---|
| 2,517,867 | 8/1950 | Glahn | 43/57.1 |
| 2,717,470 | 9/1955 | Holdeman | 206/315.11 |
| 2,734,306 | 2/1956 | Holdeman | 206/315.11 |
| 3,378,134 | 4/1968 | Wilkinson et al. | 206/315.11 |
| 3,947,991 | 4/1976 | Morcom | 43/54.1 |
| 4,505,386 | 3/1985 | Abrahamson | 206/315.11 |
| 4,697,856 | 10/1987 | Abraham | 312/135 |

Primary Examiner—Jimmy G. Foster
Attorney, Agent, or Firm—William M. Hobby

[57] ABSTRACT

A fishing tackle box apparatus has a housing with a plurality of sides and a latchable lid hinged thereto. A first carousel is rotatably mounted in the housing and has a plurality of radially extending support arms mounted around a center support cylinder for hanging a plurality of fishing lures thereon and a second carousel is slidably mounted in the center of the first carousel and also has a plurality of radially extending support arms mounted around a center support cylinder. The first carousel can be rotated to a proper position and the second carousel telescoped up for selecting a fishing lure. The fishing tackle box also has a storage drawer slidably from one side thereof and a slideout front panel. A storage space is provided for storing the panel and the box sidewalls have drain openings and at least one ventilation opening.

20 Claims, 2 Drawing Sheets

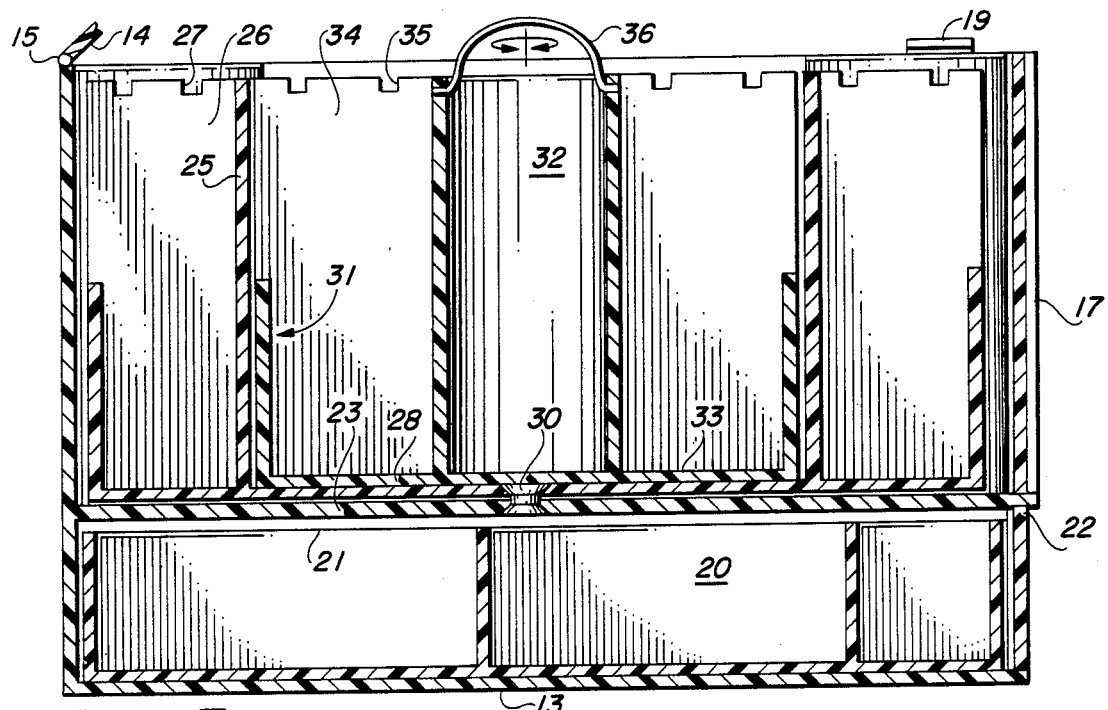
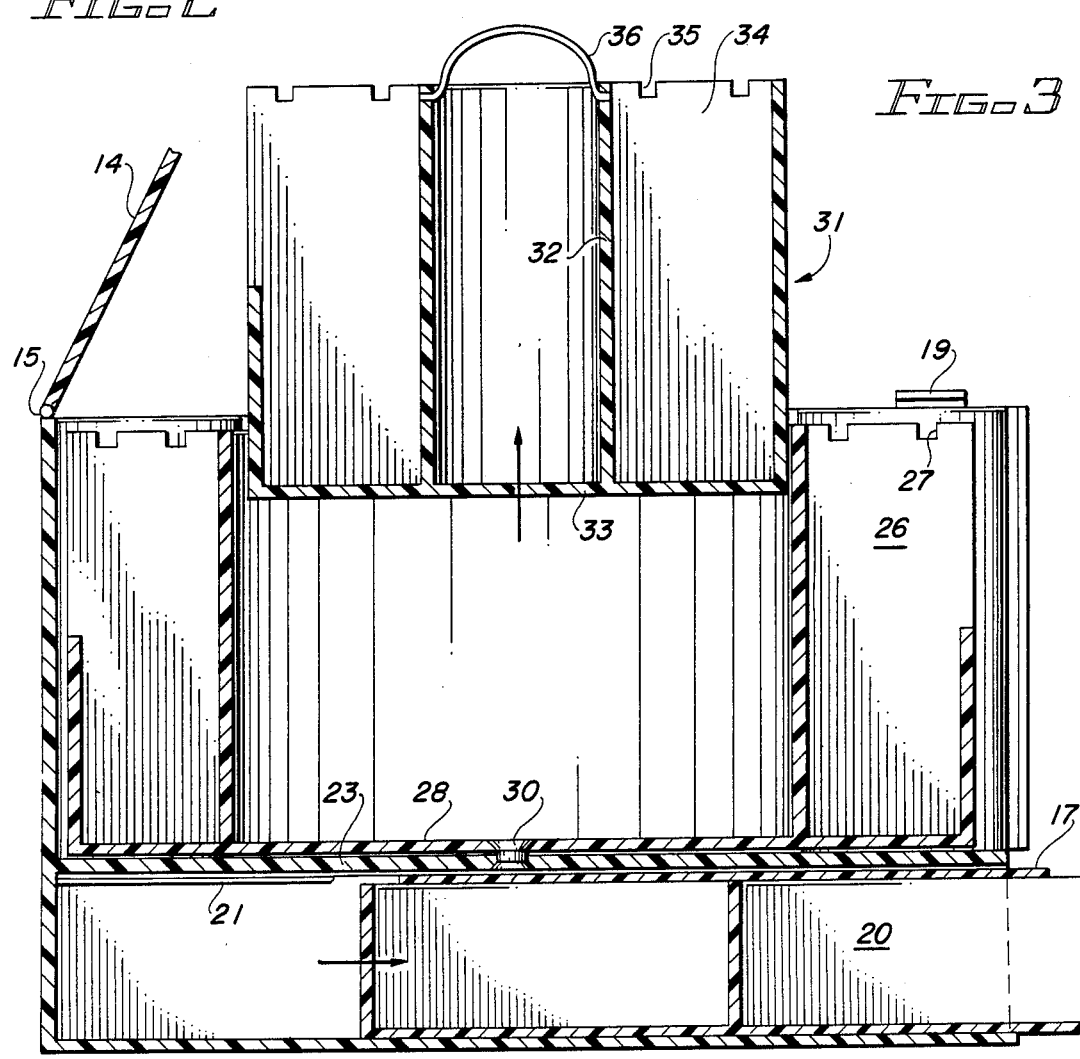

FISHING TACKLE BOX

BACKGROUND OF THE INVENTION

The present invention relates to a fishing tackle box and especially to a fishing tackle box having a rotatable carousel therein.

In the past, a wide variety of fishing tackle boxes have been provided. These boxes typically look similar to tool boxes and have a hinged opening lid having one or more divided drawers lifted by the lid when the lid is opened. Prior art fishing boxes typically have latches for maintaining the lid closed and may be made of plastic or wood. There are also special tackle boxes for different types of fishing and in a variety of different sizes.

Typical prior art U.S. Patents can be seen in the Herring U.S. Pat. No. 252,115, and in the Uyeda U.S. Pat. No. 238,400, for designs of fishing tackle boxes having supports for lures therein. The Crapanzano U.S. Pat. No. 4,516,707, has a compartmentalized container which shows fishing lures therein. The Schirmer U.S. Pat. No. 3,948,579; the Wille U.S. Pat. No. 4,040,202; and the Stoleson U.S. Pat. No. 2,683,642, each show other fishing tackle boxes.

In contrast to these prior art fishing tackle boxes, the present invention is directed towards a box which provides better visibility and access to fishing lures while allowing each fishing lure to be hung separately from one of its hooks. A pair of carousels are mounted one inside the other so that one telescopes inside the other while the outer carousel rotates. Each carousel has a plurality of radially extending arms having notches in the top thereof for supporting lures. The carousels are mounted in a square fishing tackle box having a lid and the corner spaces are filled with storage cylinders. A storage drawer is slidably mounted beneath the inside bottom supporting the carousels within the housing. A lure can be selected by rotating the outer carousel and telescoping the inner carousel to select a lure from the inner carousel. The aim of the invention is to provide a storage carousel with better storage access and visibility than provided in conventional fishing tackle boxes.

SUMMARY OF THE INVENTION

The present invention relates to a fishing tackle box having a square housing having a plurality of sides, a bottom, and a lid hinged to one of the sides. A first carousel is rotatably mounted to an inside bottom in the housing and has a plurality of radially extending support arms mounted around a center support member for supporting a plurality of fishing lures thereon hanging by the lure hooks. A second carousel is slidably mounted in the center of the first carousel and can be telescoped therein and also has a plurality of radially extending support arms mounted around a center support cylinder. The fishing tackle box lid can be opened and the outer cylinder rotated to find a lure with the inner carousel telescoped out of the inside of the outer carousel to locate a lure supported thereon. A drawer may be slidably mounted in the housing below the carousel inside bottom and a second partition may be between the drawer and the inside bottom which allows for storage of a panel therein. The front of the fishing box may have a removable panel slidably mounted in tracks which may be removed and stored in the storage space between the drawer and the inside bottom of the fishing tackle box. A plurality of hollow cylinders opened at one end may be mounted in each corner of the box to allow for additional storage. Latches are provided for the lid and at least two sides have a ventilation opening therethrough. The inside bottom of the tackle box is angled slightly downward from the center to the outside and a plurality of drain holes are provided in the side of the housing to allow water to pass through the fishing tackle box and out the drain openings. The inner carousel may be provided with a handle for lifting the carousel as well as means for locking the telescoped carousel in a lifted position.

BRIEF DESCRIPTION OF THE DRAWINGS

Other objects, features, and advantages of the present invention will be apparent from the written description and the drawings in which:

FIG. 2 is a sectional view taken on the line 2—2 of FIG. 1; and

FIG. 3 is a sectional view taken on the line 2—2 of FIG. 1 having the inner carousel in a lifted position.

DESCRIPTION OF THE PREFERRED EMBODIMENT

Figure 1:
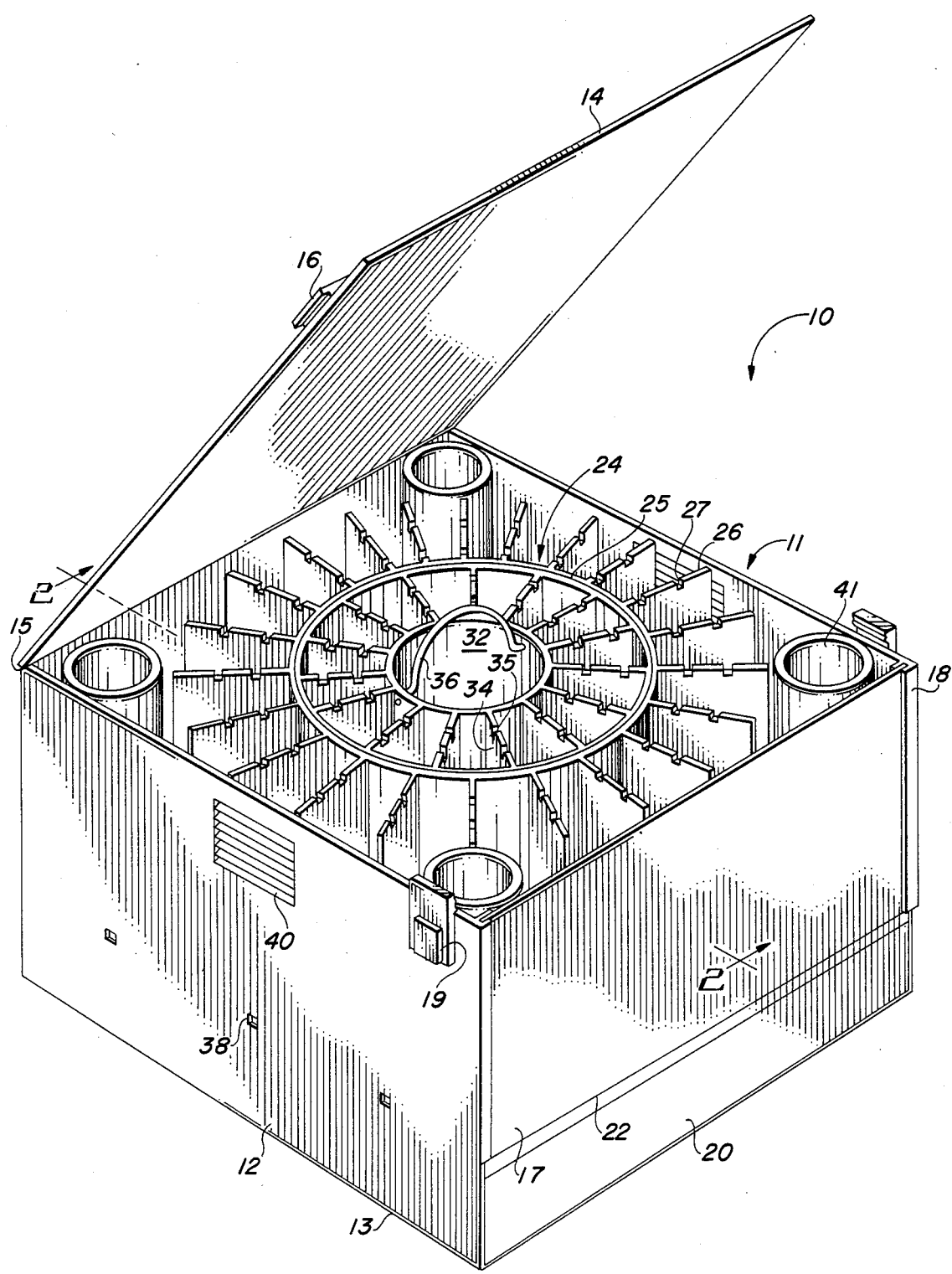
FIG. 1 is a perspective view of a fishing tackle box in accordance with the present invention.

Referring to the drawings, a fishing tackle box 10 has a housing 11 with sides 12 and a bottom side 13. The housing has a hinged lid 14 hinged at 15 and latching members 16 attached thereto. Latching members 19 are attached to the sides 12 for connecting with the latching members 16 on the lid 14. A slideout front panel 17 is slidably mounted in a pair of tracks 18 attached to the walls 12. A slideout drawer 20 is slidably positioned between the bottom 13 and a drawer partition 21. The drawer partition 21 is mounted with a space 22 thereover and under the inside bottom 23 of the tackle box 10. Space 22 allows for the storage of the lid 17 as shown in FIG. 3. The tackle box has a first carousel 24 forming an outer carousel with a cylindrical core member 25 having a plurality of radially extending arms 26. Each radially extending arm is a flat rectangular member having a pair of notches 27 therein for hanging a hook of a fishing tackle lure therefrom. The outer carousel 24 has a bottom 28 therein and has a bearing 30 connected between the bottom 28 in the inside housing bottom 23. Bearing 30 may be a ball bearing or any type of rotating bearing desired and allows the outer carousel 24 to be rotated on the bottom 23. An inside carousel 31 has a hollow cylindrical core member 32 and a bottom 33. The inside core member 32 has a plurality of radially extending arms 34 each having a pair of notches 35 in the top thereof for holding the hook of a fishing lure to allow the lure to hang therefrom.

A rotatable handle 36 is connected to the cylinder 32 for grasping and telescoping the inner carousel 31 from the position shown in FIGS. 1 and 2 to the position shown in FIG. 3. The drawer 20 can be seen to have a plurality of partitions 37 therein while the sides 12 have a plurality of drain openings 38 therethrough. The inside bottom 23 slopes two degrees or at a small angle from the inside center of the tackle box 10 downwardly toward the outside adjacent the drain openings 38. The tackle box may be washed out and any water that gets therein can readily drain from the tackle box to keep the tackle box clean and well drained. A pair of ventilation openings 40 are also mounted in two sides 12 of the tackle box 10 for allowing full ventilation to maintain fishing lures and other fishing equipment to air dry. Finally, four open end hollow cylinders 41 are mounted to each corner of the fishing tackle box 10 to avoid the wasted space which may otherwise be found in a square or rectangular-shaped box having circular carousels therein. The hollow cylinders 41 with the open ends allow for the storage of plastic worms, fishing lotion, and the like. In addition, the open end of the core member 32 for the inner carousel 31 allows an additional storage in the center for pliers or other tools.

In operation, the lid 14 can be lifted on its hinge 15 while the panel 17 can be slid out of the front of the box and slid into its storage space 22 and the drawer 20 can be opened for access to things stored in the compartments in the drawer. The carousel 24 can then be rotated to find a desired lure and, if the desired lure is in the inner carousel, it can be lifted with the handle 36 to a raised position to remove the lure from the radial arms 34. The lures can be readily removed from the radial arms 26 when the outer carousel is rotated to a position in front of the box when the lid 17 has been removed. To close the box merely requires removing the lid from the storage space 22, sliding it back in the tracks 18, and closing the lid 14 after the inner carousel 31 has been lowered back into the center of the outer carousel 24. Worms and other items can be removed from the cylinders 41 and tools or other items can be removed from the inside of the cylinder 32. The lures can be cleaned by merely hosing them down and the water will wash through the carousels onto the angled floor 23 and out the drain openings 38. If the box is then sealed, the ventilation openings 40 will then allow passage of air to dry the lures and other things in the box.

It should be clear at this time that a fishing tackle box has been provided which advantageously allows the ready access to the lures for viewing the lures by rotating a carousel and ready access to a second carousel by telescoping the second carousel within the first carousel to a raised position. It should, however, be clear that the present invention is not to be considered limited to the forms shown which are to be considered illustrative rather than restrictive.

I claim:

1. A fishing tackle box comprising:
   a housing having a plurality of sides and a latchable lid;
   at least one carousel rotatably mounted in said housing, said rotatable carousel having a plurality of radially extending support arms for hanging a plurality of fishing lures thereon and each said support arm having a notch therein for supporting a fishing lure thereon; and
   a drawer slidable mounted in said housing and at least partially slidable from said housing for access thereinto; whereby a fishing tackle box can store lures and the like in a hanging position for rotation to a desired position and other items in a separate drawer.

2. A fishing tackle box in accordance with claim 1 in which said housing has a plurality of flat sides including a bottom side and an inside bottom therein.

3. A fishing tackle box in accordance with claim 2 in which said carousel rotates on a rotating bearing rotatably mounted to said inside bottom.

4. A fishing tackle box in accordance with claim 3 in which said plurality of sides has a plurality of drain openings therein adjacent said inside bottom for draining liquid from said said tackle box.

5. A fishing tackle box in accordance with claim 4 in which said plurality of sides includes a removable panel slidably mounted in a pair of tracks mounted to a pair of said walls.

6. A fishing tackle box in accordance with claim 5 in which said housing includes a drawer partition spaced from said inside bottom to provide a space for the storage of said removable panel when removed from said slide tracks and having said drawer slidable mounted between said drawer partition and said housing bottom.

7. A fishing tackle box in accordance with claim 6 in which said one carousel has a second carousel slidably mounted in said one carousel, said second carousel having radially extending support arms extending from a center support member.

8. A fishing tackle box in accordance with claim 7 in which said second carousel center support member is a hollow cylinder whereby said center support member provides storage therein.

9. A fishing tackle box in accordance with claim 8 in which said second carousel center support member has a rotatable handle attached thereto to allow the lifting of said second carousel in said one carousel.

10. A fishing tackle box in accordance with claim 9 in which said housing has a plurality of hollow cylinders with an open end mounted therein for storage of additional items.

11. A fishing tackle box in accordance with claim 10 in which said box walls has a ventilation opening therein.

12. A fishing tackle box comprising:
    a square housing having a plurality of sides and a lid;
    a first carousel rotatably mounted in said housing, said rotatable first carousel having a plurality of radially extending support arms mounted around a center support member for hanging a plurality of fishing lures thereon; and
    a second carousel slidably mounted in the center of said first carousel and having a plurality of radially extending support arms mounted around a center support member; whereby a fishing tackle box can store lures and the like in a hanging position for rotation to a desired position.

13. A fishing tackle box in accordance with claim 12 in which said first carousel center support member is a hollow cylinder having said support arms attached to the outside and said second carousel slidably mounted inside thereof.

14. A fishing tackle box in accordance with claim 13 in which said housing has a plurality of hollow cylinders mounted thereinside, each cylinder having an open end for storage thereinside.

15. A fishing tackle box in accordance with claim 14 in which said second carousel had a handle attached thereto for lifting said second carousel within said first carousel.

16. A fishing tackle box in accordance with claim 15 in which said said housing has a drawer slidably mounted therein adjacent the bottom side of said housing.

17. A fishing tackle box in accordance with claim 16 in which said housing has an inside bottom therein above said drawer and said first carousel is rotatable mounted thereto with a center bearing.

18. A fishing tackle box in accordance with claim 17 in which said housing had a removable front panel slidable in a front track and said housing has a storage space for said panel between said drawer and said inside bottom.

19. A fishing tackle box in accordance with claim 18 in which said housing has a plurality of drain opening in the side thereof and had a ventilation opening in one side thereof.

20. A fishing tackle box in accordance with claim 19 in which said first carousel radially extending arms each has at least one notch therein to support a fishing lure hook thereon.

* * * * *